(12) United States Patent
Hirano et al.

(10) Patent No.: US 8,804,187 B2
(45) Date of Patent: Aug. 12, 2014

(54) IMAGE PROCESSING TO SUPERIMPOSE CODE ON A DOCUMENT IMAGE

(71) Applicant: Fuji Xerox Co., Ltd., Tokyo (JP)

(72) Inventors: Atsushi Hirano, Kanagawa (JP);
Tetsuya Kimura, Kanagawa (JP);
Hitoshi Okamoto, Kanagawa (JP);
Kengo Shinozaki, Kanagawa (JP)

(73) Assignee: Fuji Xerox Co.., Ltd., Tokyo (JP)

( * ) Notice: Subject to any disclaimer, the term of this patent is extended or adjusted under 35 U.S.C. 154(b) by 0 days.

(21) Appl. No.: 13/750,512

(22) Filed: Jan. 25, 2013

(65) Prior Publication Data
US 2014/0092406 A1    Apr. 3, 2014

(30) Foreign Application Priority Data
Sep. 28, 2012 (JP) ................................. 2012-218391

(51) Int. Cl.
*G06K 15/00* (2006.01)
(52) U.S. Cl.
USPC ............ 358/1.18; 358/1.5; 358/1.9; 358/540; 358/3.28; 358/2.1
(58) Field of Classification Search
CPC ........... G06K 15/00; G06K 3/00; G06K 1/00; G06K 7/1417; G06K 7/10; G06K 15/02; G07D 7/0026; H04N 1/00326; H04N 1/00363; H04N 1/32144; H04N 1/32304
USPC .......... 358/1.5, 1.9, 2.1, 3.28, 1.18, 539, 540; 382/182, 183
See application file for complete search history.

(56) References Cited

U.S. PATENT DOCUMENTS

2005/0194444 A1* 9/2005 Gieske ...................... 235/462.01
2007/0158425 A1* 7/2007 Matsuura ................. 235/462.13
2010/0157318 A1* 6/2010 Ming ............................ 358/1.1

FOREIGN PATENT DOCUMENTS

EP       1 548 635 A1    6/2005
JP       B2-3930891      6/2007

* cited by examiner

*Primary Examiner* — Jamares Q Washington
(74) *Attorney, Agent, or Firm* — Oliff PLC

(57) ABSTRACT

An image processing apparatus includes a composite image generator and a print controller. The composite image generator generates a composite image by superimposing, on a document image of a document represented by document data, two-dimensional code images individually corresponding to multiple document elements included in the document. The print controller causes a printer to print the composite image. The composite image generator determines positions of the two-dimensional code images corresponding to the document elements so that the positions do not overlap images of the document elements.

12 Claims, 9 Drawing Sheets

| CODE REGION DATA | ELEMENT NUMBER | PAGE NUMBER | DOCUMENT ID |
|---|---|---|---|
| P1 = (···, ···), P2 = (···, ···) | 1 | 1 | DOCUMENT A |

IMAGE PROCESSING TO SUPERIMPOSE CODE ON A DOCUMENT IMAGE

CROSS-REFERENCE TO RELATED APPLICATIONS

This application is based on and claims priority under 35 USC 119 from Japanese Patent Application No. 2012-218391 filed Sep. 28, 2012.

BACKGROUND

Technical Field

The present invention relates to an image processing apparatus and method and to a non-transitory computer readable medium.

SUMMARY

According to an aspect of the invention, there is provided an image processing apparatus including a composite image generator and a print controller. The composite image generator generates a composite image by superimposing, on a document image of a document represented by document data, two-dimensional code images individually corresponding to multiple document elements included in the document. The print controller causes a printer to print the composite image. The composite image generator determines positions of the two-dimensional code images corresponding to the document elements so that the positions do not overlap images of the document elements.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described in detail with reference to the drawings.

Figure 1:
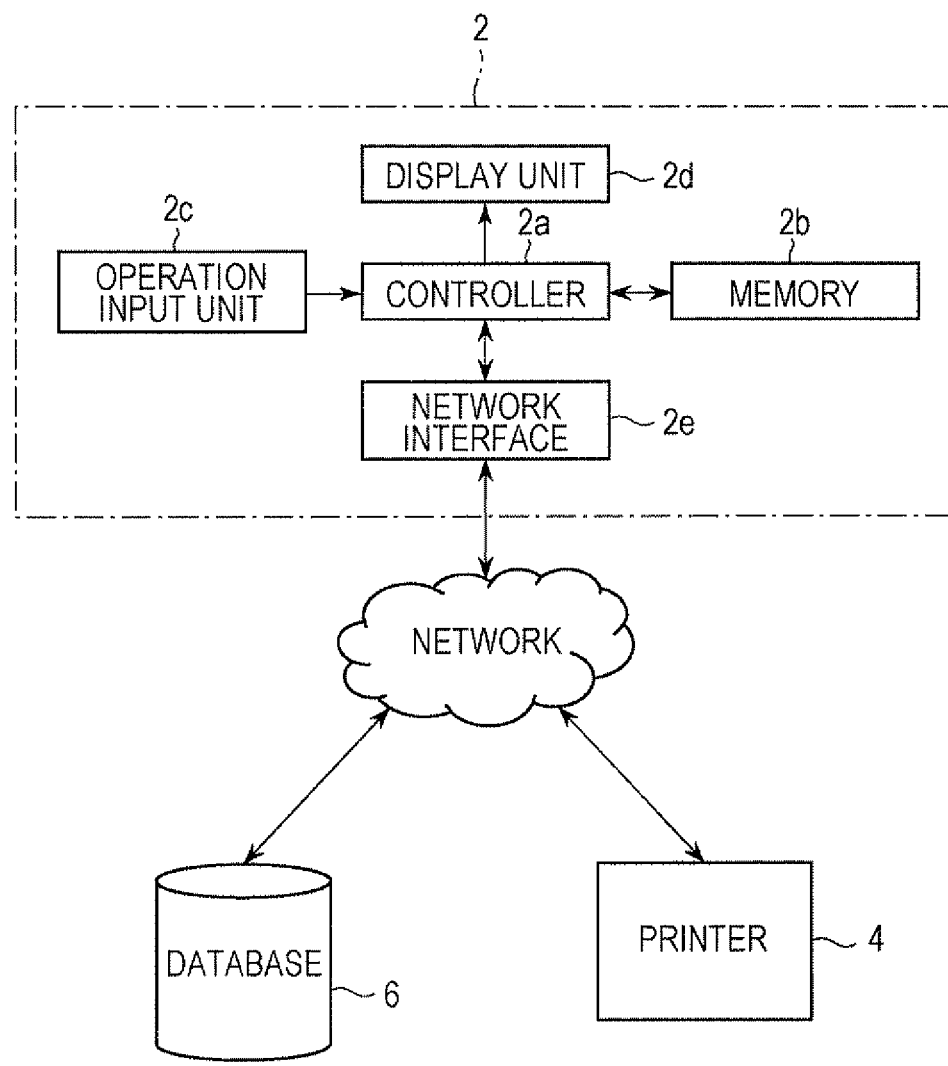
FIG. 1 is a diagram illustrating an exemplary image processing apparatus.

FIG. 1 is a diagram illustrating an example of the configuration of an image processing apparatus 2 according to an exemplary embodiment of the invention. The image processing apparatus 2 is a computer owned by a bookbinder and includes a controller 2a, a memory 2b, an operation input unit 2c, a display unit 2d, and a network interface 2e. The controller 2a is a microprocessor and executes various types of information processing in accordance with a composition program stored in the memory 2b. The memory 2b is realized with a read-only memory (ROM), a random-access memory (RAM), and a hard disk, and stores the above-described composition program. Here, the composition program is read from a computer readable information storage medium (such as a digital versatile disc (DVD) (registered trademark)) and stored in the memory 2b. Alternatively, the above-described program may be downloaded via a network and stored in the memory 2b.

Data different from the above-described composition program, stored in the memory 2b, will be described in detail later.

The operation input unit 2c includes a mouse and a keyboard, and outputs an operation signal indicating an operation performed by the bookbinder to the controller 2a. The display unit 2d is a display and displays information in accordance with a command from the controller 2a.

The network interface 2e is an interface for connecting the image processing apparatus 2 to the network. Note that a printer 4 and a database 6, which is a database server, are connected to the network. The database 6 stores multiple pieces of side reading data that is moving image data generated by a publisher X of educational books.

Besides the printer 4 and the database 6, a terminal with a code reader (not illustrated; hereinafter referred to as a "code reader terminal") owned by the publisher X, and a code reader terminal (not illustrated) owned by a student who owns a textbook published by the publisher X are also connected to the network.

Figure 2:
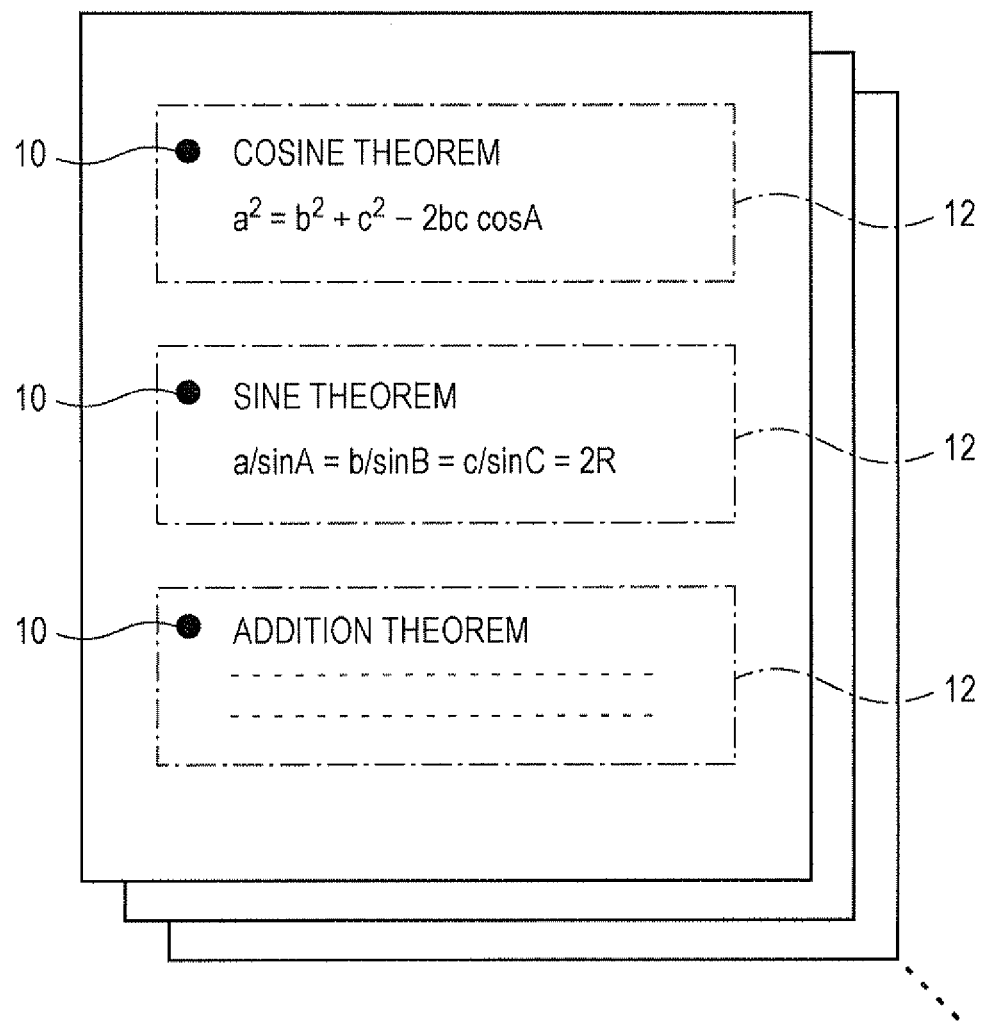
FIG. 2 is a diagram illustrating an exemplary input document.

Data stored in the memory 2b will be described. In the case of the exemplary embodiment, an input document that is document data input by the publisher X is stored in the memory 2b. The input document is document data generated by a document generating application and includes a document ID and page numbers as header information. FIG. 2 illustrates an example of the input document. In the case of the exemplary embodiment, the input document includes multiple document elements 12. Here, each of the document elements 12 is a management unit and includes text, graphics, and formulae. In the case of the exemplary embodiment, the individual document elements 12 are separated by header symbols 10. Note that the dot-and-dash lines illustrated in FIG. 2 are drawn in order only to indicate the document elements 12, and these dot-and-dash lines are not actually drawn.

Figure 3:
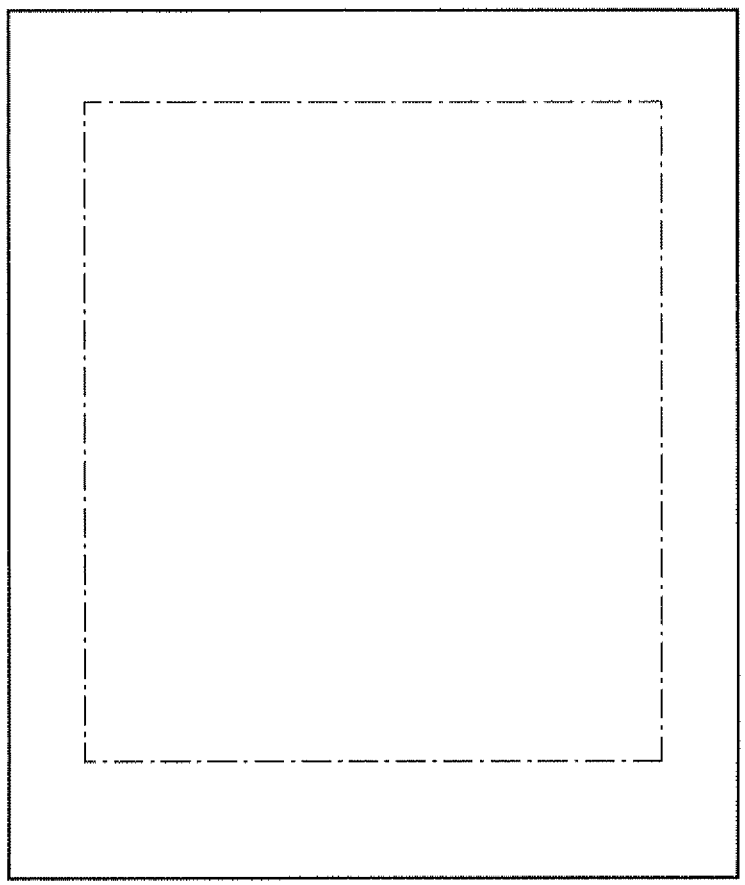
FIG. 3 is a diagram illustrating an exemplary margin region.

Note that in the case of the exemplary embodiment, the input document also includes, as header information, margin data indicating the details of settings regarding the width of the region of a margin (hereinafter referred to as a "margin region"). FIG. 3 illustrates an example of the margin region. A region outside the dot-and-dash line indicates the margin region.

On the basis of the input document, the image processing apparatus 2 generates composition data of a textbook. The image processing apparatus 2 also causes the printer 4 to print the composition data and generates a textbook.

Figure 4:
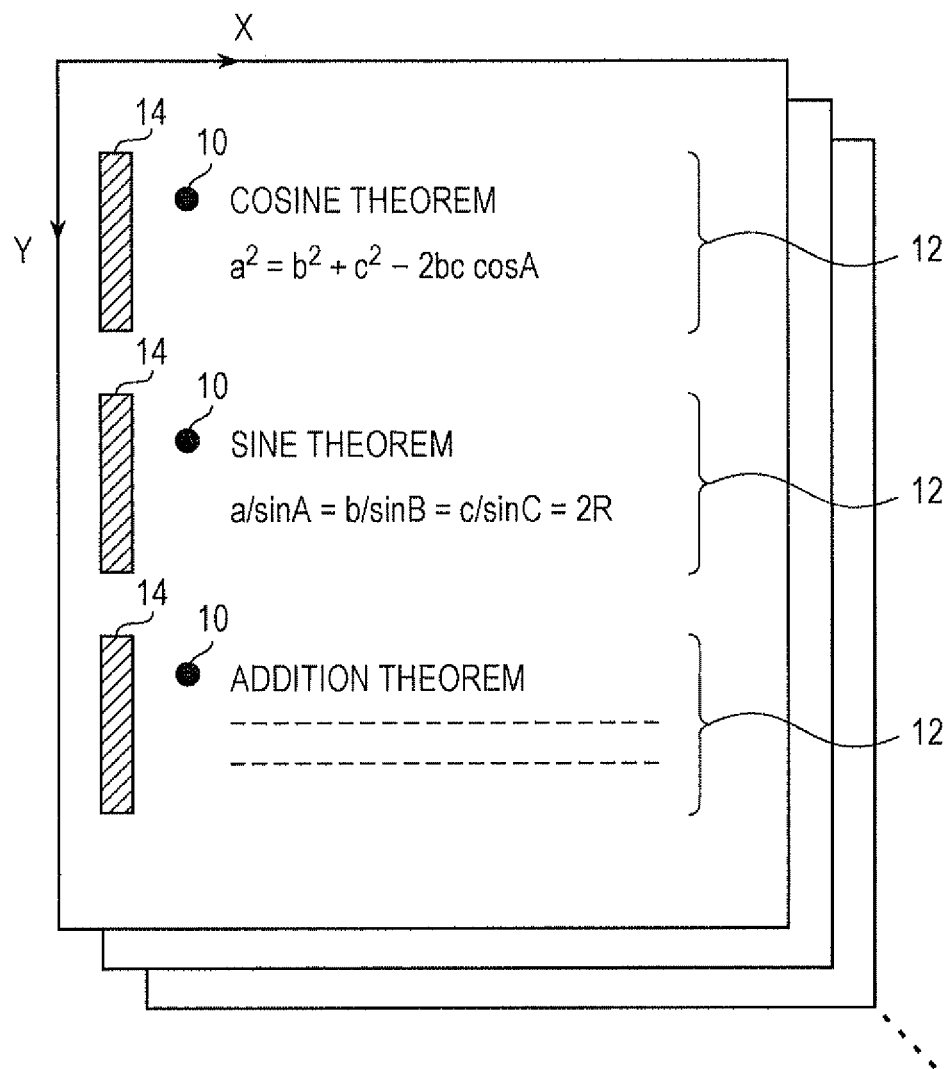
FIG. 4 is a diagram illustrating exemplary composition data.
Figure 5:
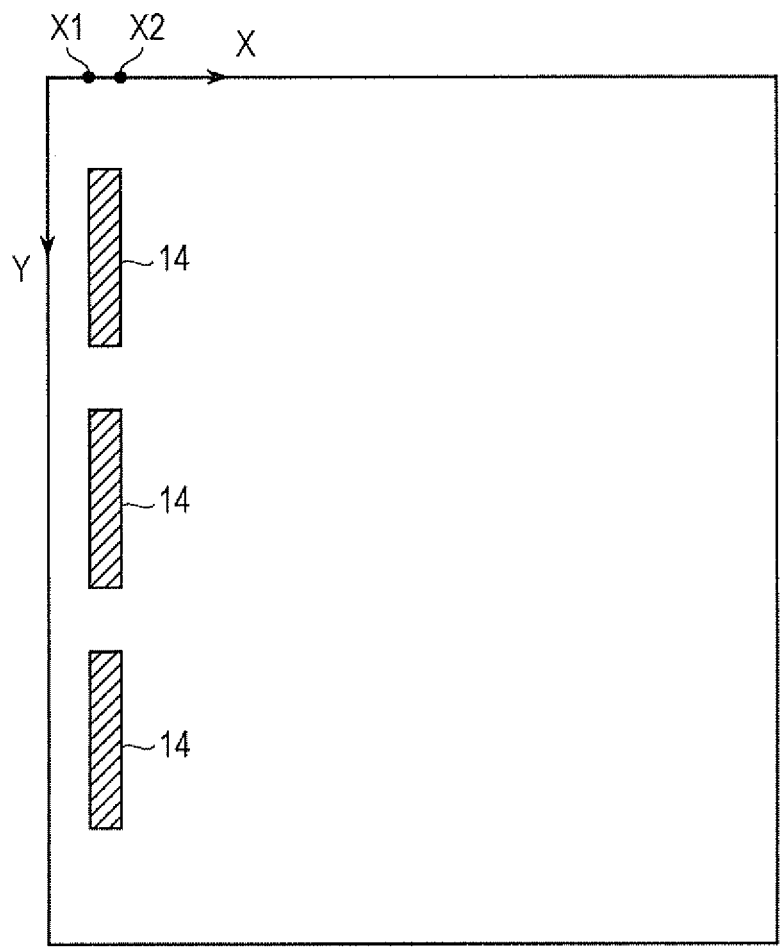
FIG. 5 is a diagram illustrating exemplary code-added image data.

FIG. 4 illustrates an example of the composition data. The composition data is bitmap data and includes images of the document elements 12, and two-dimensional code images 14 for obtaining side reading data of the document elements 12. The composition data is image data indicating a composite image where the two-dimensional code images 14 for obtaining the side reading data of the individual document elements 12 are arranged on an image of the input document. The composition data is generated by superimposing, on image data of the input document, code-added image data (for details, see FIG. 5) including the two-dimensional code images 14 for obtaining the side reading data of the individual document elements 12. The first two-dimensional code image 14 from the top is a two-dimensional code image for obtaining the side reading data of the first document element 12 from the top. The second two-dimensional code image 14 from the top is a two-dimensional code image for obtaining the side reading data of the second document element 12 from the top. The third two-dimensional code image 14 from the top is a two-dimensional code image for obtaining the side reading data of the third document element 12 from the top. As illustrated in FIG. 4, the two-dimensional code images 14 for obtaining the side reading data of the individual document elements 12 are arranged to the left of the images of these document elements 12. The two-dimensional code images 14 are formed to be smaller than the areas of the document elements 12. FIG. 5 illustrates an example of the code-added image data.

Note that a position in the image data is specified by the X-axis directional coordinate and the Y-axis directional coordinate. In the case of the exemplary embodiment, the two-dimensional code images 14 are arranged within a strip region illustrated by way of example as a hatched region in FIG. 6. The strip region is set in advance so that the images of the document elements 12 and the two-dimensional code images 14 do not overlap each other. In the exemplary embodiment, the X-coordinate of the right end of the strip region is predetermined as "X2", and the X-coordinate of the left end of the strip region is predetermined as "X1".

The student enhances his or her learning efficiency by using printed textbooks. For example, assume that the student has questions about the cosine theorem (see FIG. 4). In this case, the student causes his or her code reader terminal to scan the two-dimensional code image 14 to the left of a portion where the cosine theorem is described. Accordingly, the student obtains side reading data demonstrating the proof of the cosine theorem from the database 6, and displays the side reading data on the code reader terminal. In this way, the student has a deeper understanding of the cosine theorem.

By the way, it may seem that there is no problem in superimposing the two-dimensional code images 14 on the images of the document elements 12. However, in this case, the details represented by the images of the document elements 12 are wasted. With regard to this point, in the image processing apparatus 2, the two-dimensional code images 14 are not superimposed on the images of the document elements 12. Thus, the occurrence of the above-described circumstance is suppressed. Also, the areas of the document elements 12 are smaller than the areas of the two-dimensional code images 14. Thus, the two-dimensional code images 14 are formed to be not so striking. Because the two-dimensional code images 14 are arranged to the left to the images of the document elements 12, it is also clarified which two-dimensional code images 14 are two-dimensional code images for obtaining the side reading data of which document elements 12.

Figure 7:
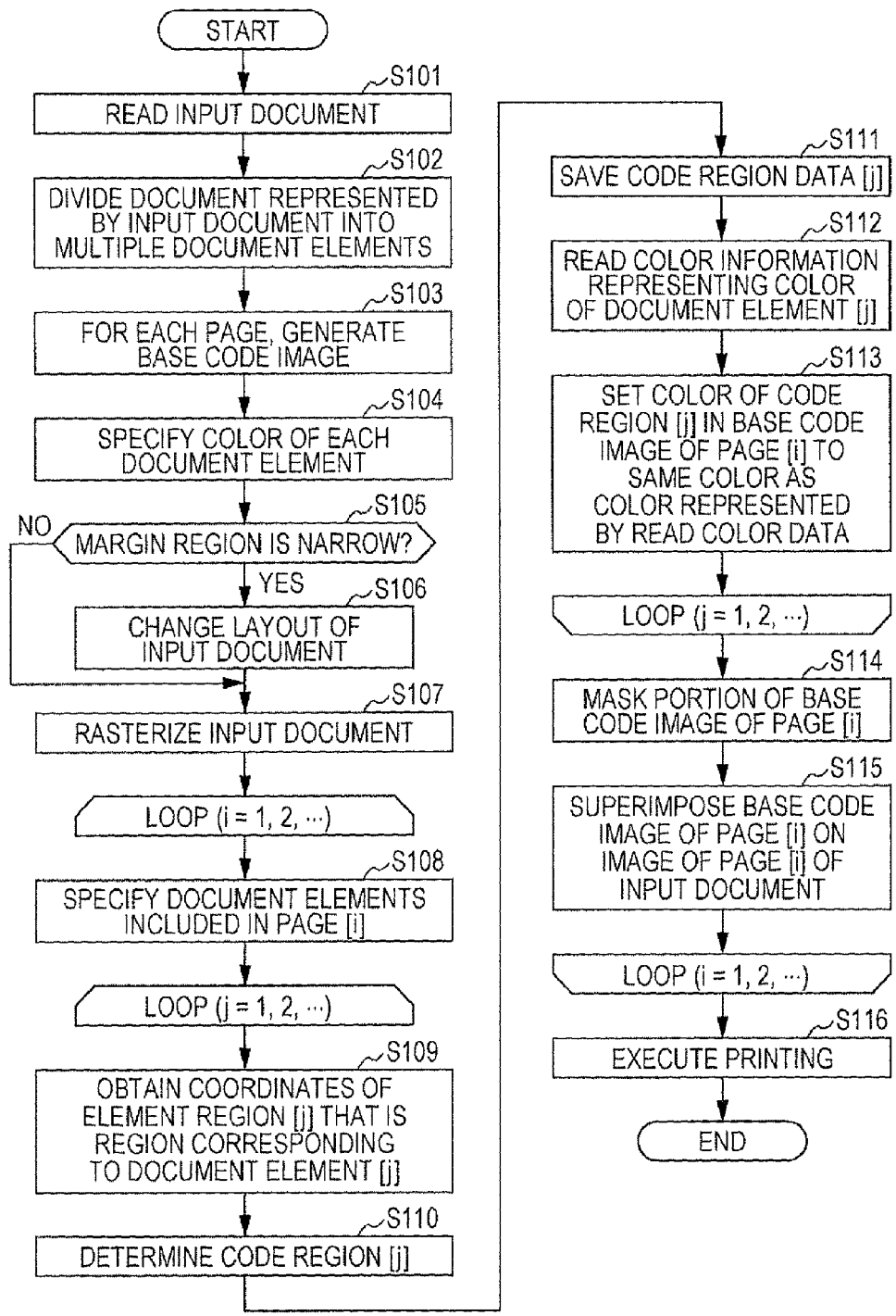
FIG. 7 is a diagram illustrating an exemplary process executed by the image processing apparatus.

Hereinafter, a process executed by the image processing apparatus 2 will be described. FIG. 7 is a flowchart illustrating an example of the process executed by the image processing apparatus 2. This process is executed by the controller 2a when, for example, the bookbinder performs a predetermined operation. Note that a "composite image generator" is realized by executing steps S101 to S115 with the controller 2a, and a "print controller" is realized by executing step S116 with the controller 2a.

Firstly, the controller 2a reads an input document stored in the memory 2b (S101). The controller 2a analyzes the input document and, in accordance with a certain rule, divides a document represented by the input document into multiple document elements 12 (S102). In the case of the exemplary embodiment, the document represented by the input document is separated immediately before each header symbol 10, and, as a result, the document is divided into multiple document elements 12.

Note that in step S102, the controller 2a also gives each of the document elements 12 an element number that is a number indicating the order of appearance of that document element 12.

Figure 8:
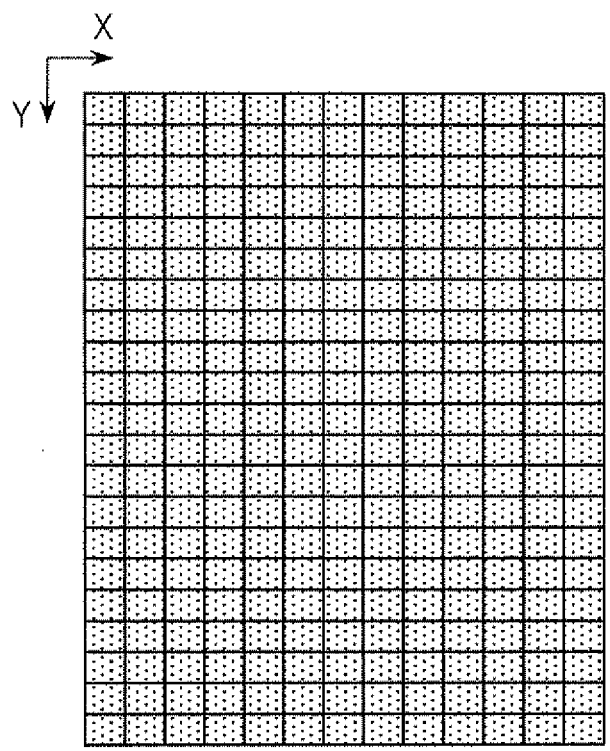
FIG. 8 is a diagram illustrating an exemplary base code image.

For each page, the controller 2a generates a base code image that is bitmap data (S103), and saves the base code image in the memory 2b. FIG. 8 illustrates an example of the base code image of a certain page. The base code image is an image serving as the base of the above-described code-added image data. In the case of the exemplary embodiment, the base code image includes unit code images arranged in a matrix. Each of the unit code images includes a position code pattern representing the positional coordinates (X, Y) of that unit code image. Also, each of the unit code images includes an identification code pattern representing the document ID of the input document and the page number. Also, each of the unit code images includes a synchronous code pattern representing a synchronous code.

Figure 9:
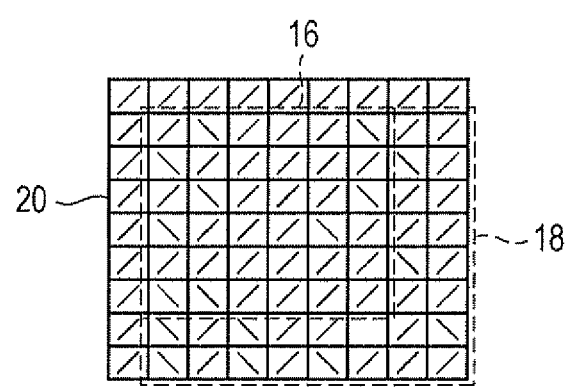
FIG. 9 is a diagram illustrating an exemplary unit code image.

FIG. 9 illustrates an example of one unit code image. In the case of the exemplary embodiment, the unit code image is a 9-bit×9-bit rectangular region, and includes a region 16 where the position code pattern is stored, a region 18 where the identification code pattern is stored, and a region 20 where the synchronous code pattern is stored.

In the case of the exemplary embodiment, each bit value is represented by a line with a different rotation angle. Specifically, the bit values "0" and "1" are represented by the symbol "/" and the symbol "\", respectively. Thus, one symbol represents one-bit information. As illustrated in FIG. 9, the region 16 where the position code pattern is stored is a 6-bit× 6-bit rectangular region, and stores information of a total of 36 bits. Also, the region 18 where the identification code pattern is stored stores 28-bit information.

The controller 2a specifies the color (i.e., the foreground color) of each of the document elements 12 by referring to the input document (S104), and saves color data indicating the specified color in the memory 2b. Also, the controller 2a determines whether the margin region is narrow (S105). Here, the controller 2a determines whether the value of the above-described margin data in the input document is a predetermined reference value.

When the margin region is not narrow (N in S105), the controller 2a proceeds to step S107. In contrast, when the margin region is narrow (Y in S105), the controller 2a (changing unit) changes the layout of the input document so that the images of the document elements 12 do not overlap the two-dimensional code images 14 (S106), and proceeds to step S107. Here, in step S106, the controller 2a updates the margin data in the input document and broadens the margin region. As a result, the positions or sizes of the images of the document elements 12 in the composition data are changed.

In step S107, the controller 2a rasterizes the input document (S107) and generates image data of the input document.

The controller 2a sequentially selects the individual pages, one page at a time, starting with the first page, as a page [i]. Every time the page [i] is selected, the controller 2a executes steps S108 to S115.

That is, the controller 2a analyzes an image of the page [i] of the input document and specifies document elements 12 included in the image of the page [i] (S108). The controller 2a sequentially selects the document elements 12, specified in step S108, one at a time, as a document element [j]. Every time the document element [j] is selected, the controller 2a executes steps S109 to S113.

That is, the controller 2a (specifying unit) obtains the coordinates indicating an element region [j] that is a region corresponding to the document element [j] (S109). Here, the element region [j] is a circumscribed rectangle of the document element [j], and the controller 2a obtains the coordinates of the upper-left vertex and the coordinates of the lower-right vertex of the element region [j].

Figures 10, 11:
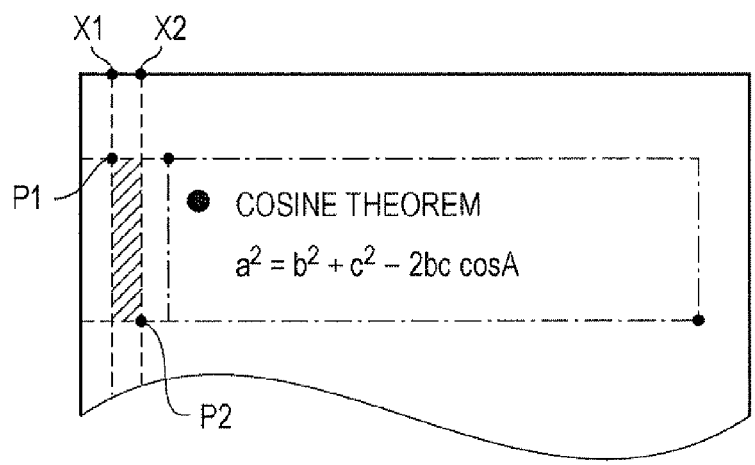
FIG. 10 is a diagram illustrating an exemplary code region.
FIG. 11 is a diagram illustrating exemplary element identification data.

The controller 2a (determining unit) determines, on the basis of the coordinates of the element region [j], a code region [j] that is a region where the two-dimensional code image 14 for obtaining the side reading data of the document element [j] is to be arranged (S110). Here, the controller 2a determines, as the code region [j], a rectangular region surrounded by the right side of the above-described strip region, the left side of the above-described strip region, an extension of the upper side of the element region [j], and an extension of the lower side of the element region [j]. FIG. 10 illustrates an example of the code region [j]. A hatched region indicates the code region [j], and a region surrounded by the dot-and-dash line indicates the element region [j]. Note that a vertex P1 indicates the upper-left vertex of the code region [j], and a vertex P2 indicates the lower-right vertex of the code region [j].

The controller 2a saves, in the database 6, code region data [j] that includes the coordinates indicating the code region [j] (S111). Here, the code region data [j] includes the coordinates of the vertex P1 and the coordinates of the vertex 22. The controller 2a saves, in the database 6, element identification data obtained by associating the element number of the document element [j], the page number of the page [1], and the document ID of the input document. FIG. 11 illustrates an example of the element identification data. The element identification data plays the role of identification data of the document element [j]. Note that the element identification data may be data obtained by further associating the element numbers of the document elements before and after the document element [j] to the code region data [j] (information). That is, the controller 2a (associating unit) may associate the element numbers of the document elements before and after the document element [j] to the code region data [i].

The controller 2a (determining unit) reads color data indicating the color of the document element (j) from the memory 2b (S112), and determines the color of a portion of a base code image of the page [i] on the basis of the read color data (S113). That is, in order to clarify which two-dimensional code images 14 are two-dimensional code images for obtaining the side reading data of which document elements 12, in step S113, the controller 2a sets the color of the code region [j] in the base code image of the page [i] to the same color as the color represented by the color data read in step S112.

In this manner, upon execution of steps S109 to S113 for all the document elements 12 included in the page [i], the controller 2a executes a masking process on the base code image of the page [i] and masks a portion of the base code image of the page [i] (S114). That is, in step S114, the controller 2a masks a region excluding the determined code region, for each of the document elements 12 included in the page [i]. In other words, in step S114, the controller 2a sets a region excluding each code region as a non-display region.

The controller 2a superimposes the masked base code image (that is, the code-added image data in FIG. 5) of the page [i] on the image of the page [i] of the input document, and generates image data indicating a composite image (S115). As a result of step S115, composition data corresponding to one page is generated.

As a result of execution of steps S108 to S115 for the individual pages, the above-described composition data is generated. When generation of the composition data is completed, the controller 2a (print controller) sends a print request of the composition data to the printer 4, and causes the printer 4 to print the composition data (S116). As a result, a textbook is printed.

The printed textbook is delivered to the publisher X. Before publishing the textbook, the publisher X executes, for example, a work described below. That is, the publisher X accesses the database 6 with its own code reader terminal, and associates side reading data with each piece of element identification data (see FIG. 11) via the code reader terminal. For example, after selecting the side reading data demonstrating the proof of the cosine theorem (see FIG. 4), the publisher X causes the code reader to scan the two-dimensional code image 14 to the left of a portion where the cosine theorem is described. As a result, data (coordinates, document ID, and page number) scanned from the two-dimensional code image 14 is sent to the database 6. In the database 6, element identification data that satisfies the following two conditions (hereinafter referred to as "particular element identification data") is specified, and the side reading data, selected by the publisher X, is associated with the specified particular element identification data.

Condition 1

A code region represented by code region data includes a position represented by coordinates scanned from the two-dimensional code image 14.

Condition 2

The code region includes both the document ID and the page number scanned from the two-dimensional code image 14.

After completion of the above-described work, the textbook is placed at a bookstore and is purchased by the student. For example, assume that the student has questions about the cosine theorem (see FIG. 4) and causes his or her code reader terminal to scan the two-dimensional code image 14 to the left of a portion where the cosine theorem is described. In this case, data (coordinates, document ID, and page number) scanned from the two-dimensional code image 14 is sent to the database 6. With the database 6, the above-described particular element identification data is specified, and side reading data associated with the specified element identification data is sent back to the student's code reader terminal. As a result, the side reading data demonstrating the proof of the cosine theorem is displayed on the code reader terminal.

Note that the exemplary embodiment of the invention is not limited to the above-described exemplary embodiment.

For example, the method of clarifying which two-dimensional code images 14 are two-dimensional code images for obtaining the side reading data of which document elements 12 is not limited to the method described above.

That is, as a first method, for the individual pairs of the images of the document elements 12 and the two-dimensional code images 14 for obtaining the side reading data of these document elements 12, the controller 2a (composite image generator) may arrange images of lines connecting the images of the document elements 12 and the two-dimensional code images 14, on the image of the input document. In this case, the controller 2a may specify, prior to step S111, for example, the coordinates of the midpoint of the left side of the element region [j] and the coordinates of the midpoint of the right side of the code region [j], and may arrange the image of a line connecting the two midpoints on the image of the page [i] of the input document. As a second method, for the individual pairs described above, the controller 2a (composite image generator) may arrange identification images (such as the images of certain figures or symbols) for identifying these pairs in the vicinity of the images of the document elements 12 constituting the pairs and in the vicinity of the two-dimensional code images 14 constituting the pairs. In this case, the controller 2a may arrange, prior to step S111, the identification images at, for example, the position of the upper-left vertex of the element region [j] and at the position of the upper-left vertex of the code region [j] on the image of the page [i] of the input document.

Figure 6:
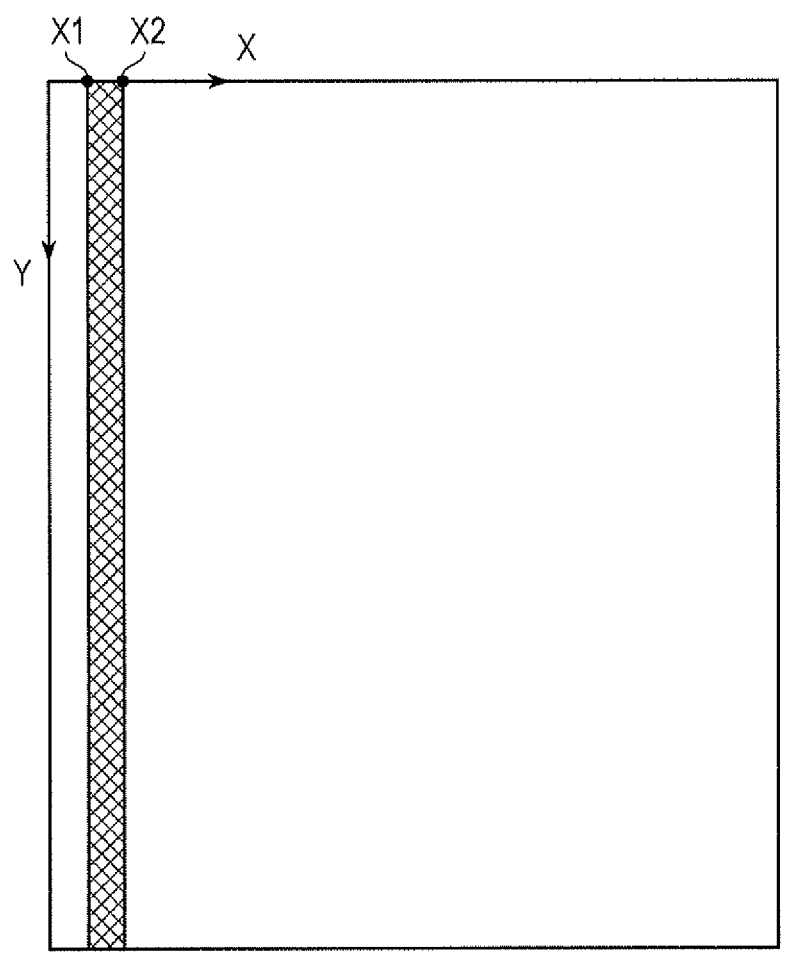
FIG. 6 is a diagram illustrating an exemplary strip region.

Also in step S114, the controller 2a may mask only a region excluding the above-described strip region (see FIG. 6). In this case, the controller 2a may arrange a certain image (such as the image of a certain figure or symbol) between code regions that are vertically adjacent to each other.

Although one two-dimensional code image 14 is provided for one document element 12 above, multiple two-dimensional code images 14 may be provided for one document element 12. For example, two-dimensional code images 14 may be provided to the right and left of one document element 12. Specifically, in step S110, the controller 2a determines whether the horizontal width of the element region [j] is greater than or equal to a reference length. When the horizontal width of the element region [j] is less than the reference length, a code region [j] is set only to the left of the element region [j]. When the horizontal length of the element region [j] is greater than or equal to the reference length, code regions [j] are set on both sides of the element region [j].

For example, in step S106, the controller 2a may change the layout of the input document by a method different from updating the margin data. For example, in step S106, the controller 2a may reduce the font size.

For example, the document represented in the input document may be divided into multiple document elements 12 in accordance with a rule other than that described above. For example, one object included in the input document may serve as one document element 12. Alternatively, for example, text of one paragraph may serve as one document element 12.

For example, the position of the above-described strip region may change between odd-numbered pages and even-numbered pages. This is because the width of the margin region may be different between odd-numbered pages and even-numbered pages.

Although the two-dimensional code images 14 are provided to the left of the document elements 12 above, the positions of the two-dimensional code images 14 with respect to the document elements 12 may be any positions. For example, the two-dimensional code images 14 may be positioned in the upper left of the document elements 12, depending on the specification (particularly the shape) of the student's code reader terminal.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a composite image generator that generates a composite image by superimposing, on a document image of a document represented by document data, two-dimensional code images individually corresponding to a plurality of document elements included in the document; and
    a print controller that causes a printer to print the composite image,
    wherein the composite image generator determines positions of the two-dimensional code images corresponding to the document elements so that the positions do not overlap images of the document elements,
    wherein the document elements are sequenced,
    wherein information represented by each two-dimensional code image is stored in a memory, and
    wherein the image processing apparatus further comprises an associating unit that associates, with the information represented by each two-dimensional code image corresponding to a corresponding one of the document elements, the information represented by the two-dimensional code images corresponding to the document elements before and after the corresponding one of the document elements.

2. The image processing apparatus according to claim 1, wherein areas of the two-dimensional code images corresponding to the document elements are smaller than areas of the images of the document elements.

3. The image processing apparatus according to claim 1, further comprising:
    a specifying unit that specifies positions of the images of the document elements in the document image,
    wherein the composite image generator includes
        a determining unit that determines the positions of the two-dimensional code images corresponding to the document elements on the basis of the positions of the images of the document elements in the document image.

4. The image processing apparatus according to claim 2, further comprising:
    a specifying unit that specifies positions of the images of the document elements in the document image,
    wherein the composite image generator includes
        a determining unit that determines the positions of the two-dimensional code images corresponding to the document elements on the basis of the positions of the images of the document elements in the document image.

5. The image processing apparatus according to claim 1, further comprising:
    an obtaining unit that obtains color information regarding colors of the document elements,
    wherein the composite image generator includes
        a determining unit that determines colors of the two-dimensional code images corresponding to the document elements on the basis of the color information regarding the colors of the document elements.

6. The image processing apparatus according to claim 2, further comprising:
an obtaining unit that obtains color information regarding colors of the document elements,
wherein the composite image generator includes
a determining unit that determines colors of the two-dimensional code images corresponding to the document elements on the basis of the color information regarding the colors of the document elements.

7. The image processing apparatus according to claim 1, wherein the composite image generator generates the composite image by superimposing, on the document image, the two-dimensional code images individually corresponding to the document elements, and images indicating which two-dimensional code images correspond to which document elements.

8. The image processing apparatus according to claim 2, wherein the composite image generator generates the composite image by superimposing, on the document image, the two-dimensional code images individually corresponding to the document elements, and images indicating which two-dimensional code images correspond to which document elements.

9. The image processing apparatus according to claim 1,
wherein the two-dimensional code images are arranged in a predetermined region, and
wherein the composite image generator includes
a changing unit that changes positions or sizes of the images of the document elements so that the images of the document elements do not contact the predetermined region.

10. The image processing apparatus according to claim 2,
wherein the two-dimensional code images are arranged in a predetermined region, and
wherein the composite image generator includes
a changing unit that changes positions or sizes of the images of the document elements so that the images of the document elements do not contact the predetermined region.

11. A non-transitory computer readable medium storing a program causing a computer to execute a process, the process comprising:
generating a composite image by superimposing, on a document image of a document represented by document data, two-dimensional code images individually corresponding to a plurality of document elements included in the document, wherein the document elements are sequenced, and wherein information represented by each two-dimensional code image is stored in a memory;
causing a printer to print the composite image;
determining positions of the two-dimensional code images corresponding to the document elements so that the positions do not overlap images of the document elements, and
associating, with the information represented by each two-dimensional code image corresponding to a corresponding one of the document elements, the information represented by the two-dimensional code images corresponding to the document elements before and after the corresponding one of the document elements.

12. An image processing method comprising:
generating a composite image by superimposing, on a document image of a document represented by document data, two-dimensional code images individually corresponding to a plurality of document elements included in the document, wherein the document elements are sequenced, and wherein information represented by each two-dimensional code image is stored in a memory;
causing a printer to print the composite image;
determining positions of the two-dimensional code images corresponding to the document elements so that the positions do not overlap images of the document elements, and
associating, with the information represented by each two-dimensional code image corresponding to a corresponding one of the document elements, the information represented by the two-dimensional code images corresponding to the document elements before and after the corresponding one of the document elements.

* * * * *